(12) United States Patent
Chichery et al.

(10) Patent No.: US 6,299,829 B1
(45) Date of Patent: Oct. 9, 2001

(54) DEVICE FOR IMMOBILIZING AN ELEMENT OF A KINEMATIC SYSTEM

(75) Inventors: Laurent Chichery, Nevers; Louis Faure, Premont; Claude Liszczynski, Fourchambault, all of (FR)

(73) Assignee: Compagnie Engrenages et Reducteurs-Messian-Durand, Cambrai (FR)

( * ) Notice: Subject to any disclaimer, the term of this patent is extended or adjusted under 35 U.S.C. 154(b) by 0 days.

(21) Appl. No.: 09/488,827

(22) Filed: Jan. 21, 2000

(30) Foreign Application Priority Data

Jan. 21, 1999 (FR) .................................................. 99 00645

(51) Int. Cl.[7] .................................................. C21C 5/50
(52) U.S. Cl. .......................................... 266/245; 266/275
(58) Field of Search ...................................... 266/245, 246, 266/247, 275; 192/4 A, 9

(56) References Cited

U.S. PATENT DOCUMENTS

| | | | | |
|---|---|---|---|---|
| 257,898 | * | 5/1882 | Smith | 266/245 |
| 804,080 | * | 11/1905 | Wills | 266/246 |
| 1,033,062 | * | 7/1912 | Collin | 266/245 |
| 3,219,322 | * | 11/1965 | Murer | 266/245 |
| 4,310,081 | | 1/1982 | Kolacz . | |

FOREIGN PATENT DOCUMENTS

| | | |
|---|---|---|
| 0 544 116 A2 | 2/1993 | (EP) . |
| 0 544 116 A3 | 2/1993 | (EP) . |
| 0 267 348 A1 | 7/1994 | (EP) . |

\* cited by examiner

*Primary Examiner*—Scott Kastler
(74) *Attorney, Agent, or Firm*—Connolly Bove Lodge & Hutz

(57) ABSTRACT

A device for immobilizing an element (1) of a kinematic system comprising a member (11) having on its periphery upstanding parts and recessed parts of complementary profile to upstanding and recessed parts of the element to be immobilized and mounted at the end of an arm (14), a unit for moving the member (11) between a passive position disengaged from the element (1) to be immobilized and an position in which the respective upstanding and recessed parts of the element (1) and the member interpenetrate to immobilize the element (1) for placing the upstanding parts opposite the recessed parts of the element (1) and the member (11), respectively, and a device for detecting the position of the arm (14) carrying the member (11). The invention applies to immobilizing a toothed ring of a steelmaking converter ladle.

15 Claims, 7 Drawing Sheets

DEVICE FOR IMMOBILIZING AN ELEMENT OF A KINEMATIC SYSTEM

FIELD OF THE INVENTION

The present invention consists in a device for immobilizing an element of a kinematic system, for example, an element of a gear transmission.

The invention also consists in an installation for controlling the tilting of a steelmaking converter ladle equipped with an immobilizing device of this kind.

BACKGROUND OF THE INVENTION

In various industrial sectors, for example the manufacture of iron and steel, sugar, cement, foodstuffs, etc. the manufacturing processes require a shaft, tubes or tanks with large dimensions and which are often subject to external mechanical, thermal or vibrational loads to be driven in rotation and immobilized in particular positions.

They are usually driven via a gear ring or wheel of large diameter mounted on the element to be driven.

In some applications, the operating cycle requires energetic immobilization in a stopped position of the receiving machine, which is subject to various loads.

This is the case, for example, when injecting gaseous fluids into a converter or any other similar tank during the production of steel or any other product, with the consequent presence of high vibrational stresses on the kinematic system. The injection of gaseous fluids under pressure into converter ladles generates vibrational stresses and high stresses likely to lead to fatigue damage of the gear transmission units and this makes it essential to oversize certain elements of the transmission units by a safety factor greater than two or even three.

These stresses occur either continuously, with varying intensity, or with violent intensities during the blowing of gases at periods of a few minutes.

In new converter designs, the center of gravity of the ladle is at a greater or lesser distance from its pivot axis. The proximity of the center of gravity to the axis occasions very high vibrational intensities and causes dynamic instability of the converter.

The element of the kinematic system, i.e. the toothed ring in the case of a converter, must be immobilized with total safety in a precise angular position and without any backlash.

Devices for immobilizing an element by eliminating the backlash of gears in the kinematic system of a reduction gear by contact with the opposite flanks of the same mobile member are well known in the art.

In this case, the reduction gears comprise a ring connected to the element to be immobilized and driven by two gears. A tilting primary reduction gear is mounted on each gear, the forces being balanced by a compression or tension bar connecting the two primary reduction gears.

Contact without clearance is obtained by means of a hydraulic ram which tilts the two primary reduction gears in opposite directions to prestress the opposite flanks of the teeth.

Another device well known in the art for immobilizing an element, consisting of a gear ring, for example, by means of a split torque reduction gear is made up of two autonomous casings each carrying a gear driving the gear ring.

The tangential forces are balanced between the two casings by means of a torsion bar. The contact between the opposite flanks and the immobilizing of the ring are obtained by the forced displacement of the two casings in the same direction, generally the downward direction, to effect the required prestressing.

This movement is obtained with one or two hydraulic rams which swing the torsion bar.

In the case of a single ram, the device is positioned directly on the torsion bar, and in the case of two rams the device applies the force directly to each of the two casings.

SUMMARY OF THE INVENTION

The object of the invention is a device for immobilizing an element of a kinematic system which has the advantage of being particularly compact and robust and capable of strongly mobilizing said element to be immobilized despite high external mechanical, thermal or vibrational loads.

The invention therefore consists in a device for immobilizing an element of a kinematic system, the element carrying a succession of upstanding parts and recessed parts, and including:

- a member having at; its periphery upstanding parts and recessed parts of complementary profile to the upstanding parts and recessed parts of the element to be immobilized and mounted at the end of an arm whose opposite end is articulated about a pivot shaft,
- a unit for moving the member between a passive position disengaged from the element to be immobilized and an active position in which the upstanding parts and the recessed parts, respectively, of the element and the member interpenetrate to immobilize that element in a particular position,
- means for indexing the position of the element in the particular position to place the upstanding parts facing the recessed parts, respectively, of the element and the member, and
- means for sensing the position of the arm.

According to other features of the invention:

- the member is fixed to the corresponding end of the arm to form a one-piece assembly,
- the member is articulated to the corresponding end of the arm by means of a shaft carried by the arm,
- the unit for moving the member is a ram with a piston rod whose free end bears on a face of the member opposite the face with the upstanding parts and recessed parts,
- the bearing surface of contact between the free end of the piston rod of the ram and the member is spherical,
- the indexing means include a track formed on the element and including a succession of projections and
- the sensing unit is formed by a proximity sensor cooperating with a rod that can move in translation and carries at one end a roller rolling on the track,
- the device includes means for positioning in translation the arm carrying the member,
- the means for positioning the arm in translation are formed by a cam formed on the pivot shaft of the arm,
- the means for sensing the position of the arm are formed by a sensor mounted on the pivot shaft of the arm,
- the element to be immobilized is disposed in a casing,
- the assembly formed of the member, the arm and the unit for displacing the member is inside or outside the casing, and
- the casing has an anti-torque reaction bar including means for adjusting the position of the element to be immobilized relative to a reference marker of the installation by modifying the length of the reaction bar.

The invention also consists in an installation for controlling the tilting of a steelmaking converter ladle, the installation including a toothed ring attached to a pivot shaft of the ladle and driven in rotation by at least one gear, wherein the ring includes at least one immobilizing device as mentioned above.

BRIEF DESCRIPTION OF THE DRAWINGS

The features and advantages of the invention will become apparent during the course of the following description which is given by way of example only and with reference to the accompanying drawings, in which.

DESCRIPTION OF PREFERRED EMBODIMENT

Figure 1:
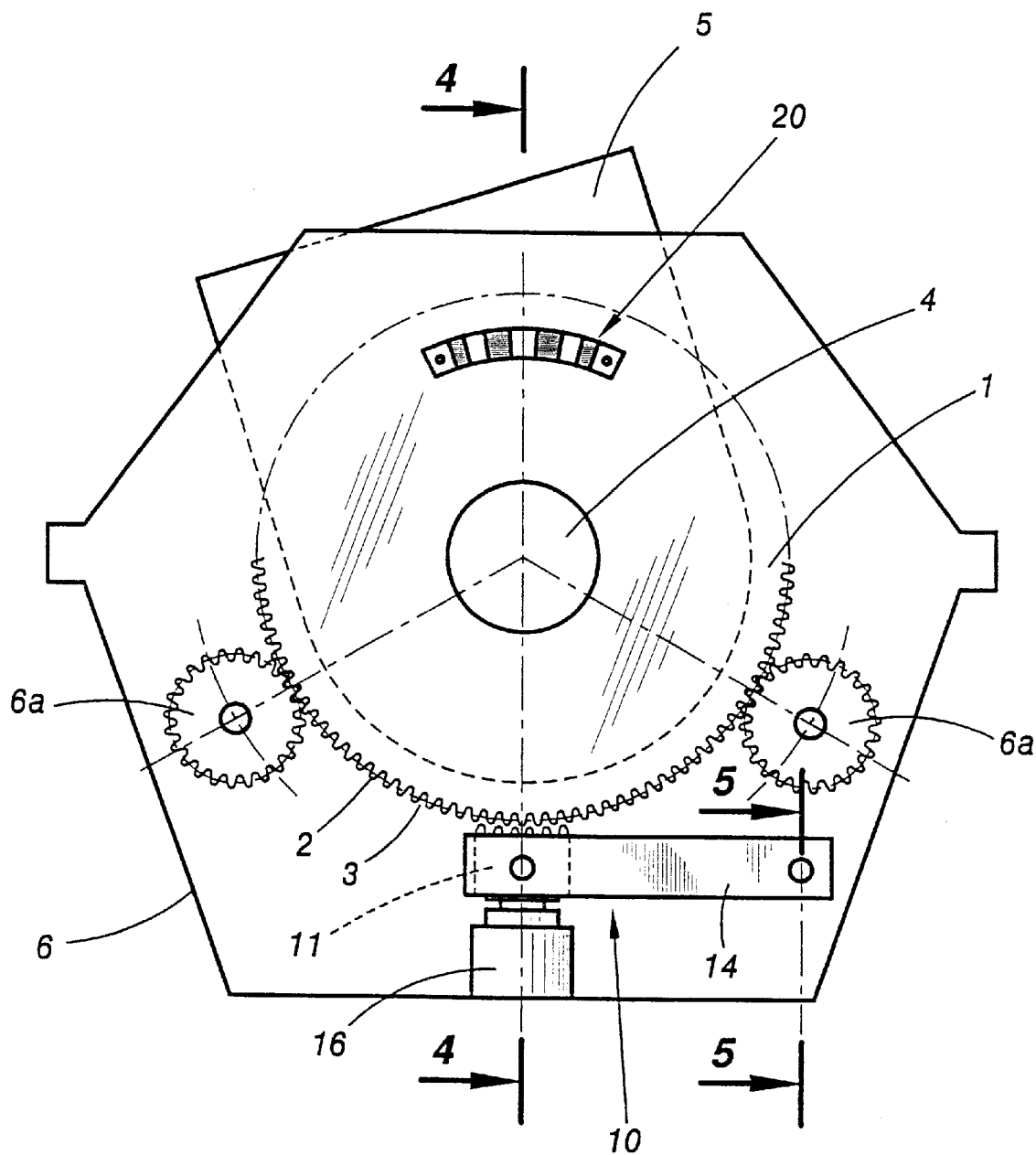
FIG. 1 is a schematic elevation view of one embodiment of an element of a kinematic system fitted with an immobilizing device in accordance with the invention.

In the following description, the device for immobilizing an element of a kinematic system is described, by way of example, in an installation for controlling the tilting of a steelmaking converter ladle.

The immobilizing device of the invention can be used to immobilize any element of a kinematic system in various installations used, for example, in the manufacture of iron and steel, sugar, cement, the agriculture-foodstuffs industries or any other industry.

The element of the kinematic system to be immobilized generally includes a succession of upstanding and recessed parts. In the embodiment of the invention shown in the drawings the element to be immobilized is a toothed ring 1 whose periphery has a succession of upstanding parts 2 and recessed parts 3.

As shown schematically in FIG. 1, the toothed ring 1 is connected directly to a shaft 4 of a ladle 5 to be tilted or rotated.

Figure 2:
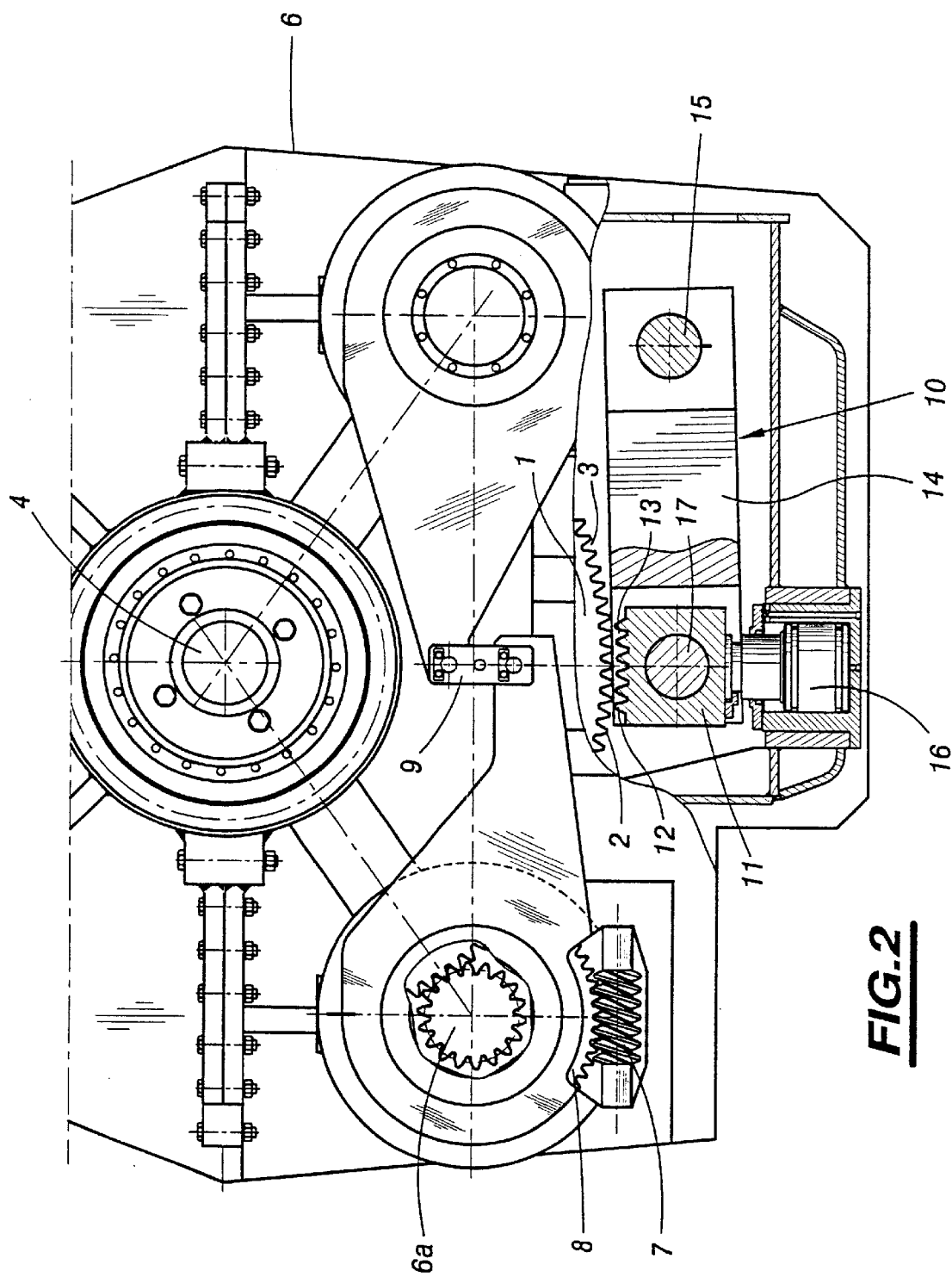
FIG. 2 is a part-sectional view of part of the kinematic system from FIG. 1 showing, to a larger scale, a first embodiment of the immobilizing device of the invention.

To this end, and as shown in FIGS. 1 and 2, the toothed ring 1 is associated with a rotational drive device which includes a split torque reduction gear which includes a main casing 6 containing the toothed ring 1 and two gears 6a meshing with it.

The input shafts 7 (FIG. 2) of the orthogonal axis primary reduction gears mesh in the conventional way with a primary wheel 8 constrained to rotate with the corresponding gear 6a.

The casings of the primary reduction gears are connected by an articulated arm 9 which therefore balances the drive torques, and the input shafts 7 are rotationally coupled by a universal joint or domed tooth sliding transmission (not shown), which splits the power.

The kinematic system includes a device for immobilizing one of the elements, which in this example is the toothed ring 1, in order to immobilize the converter ladle 5 against rotation in a particular position, for example a position for blowing gases.

Figure 3:
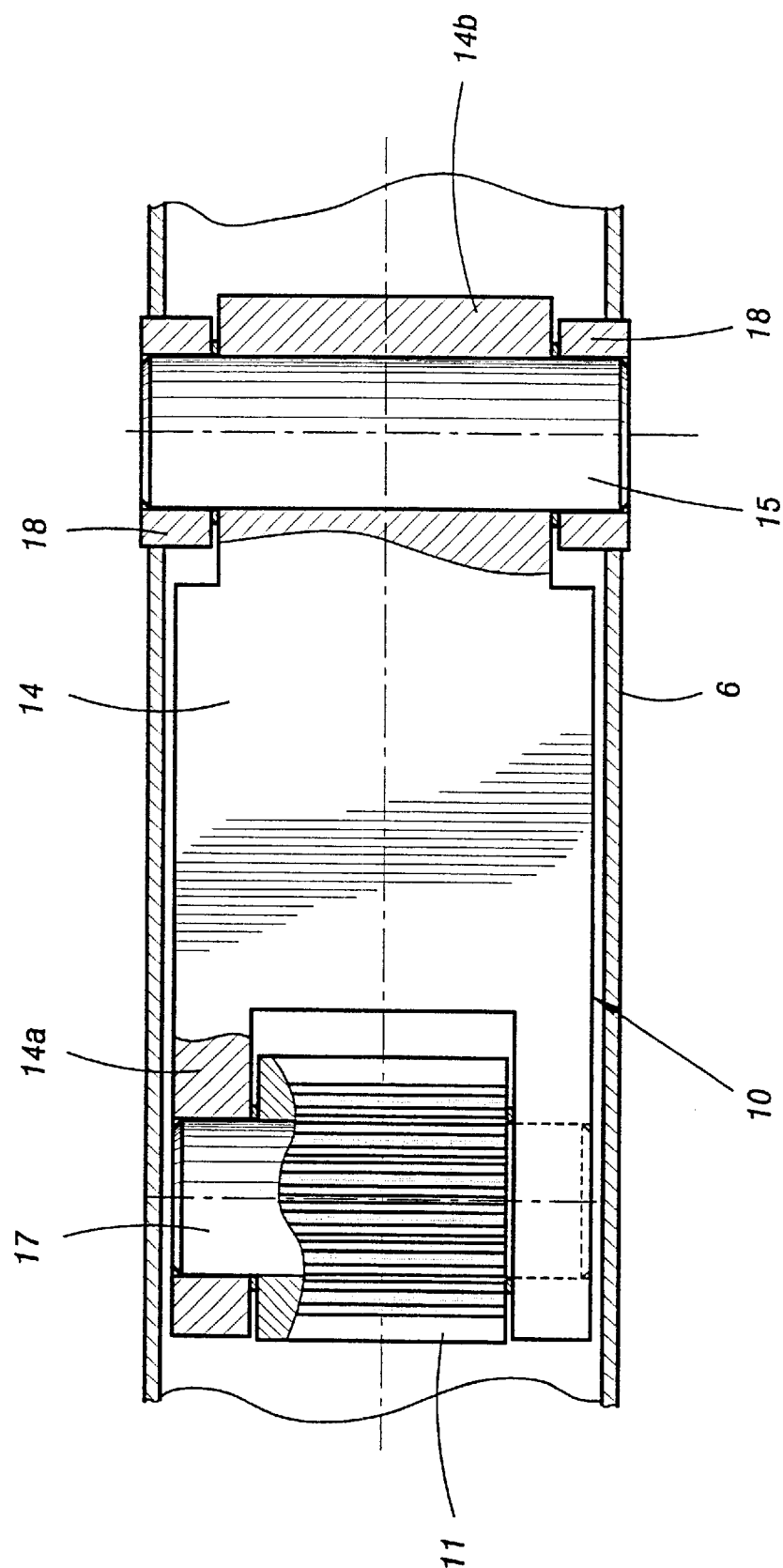
FIG. 3 is a plan view of the immobilizing device of the invention.
Figure 4:
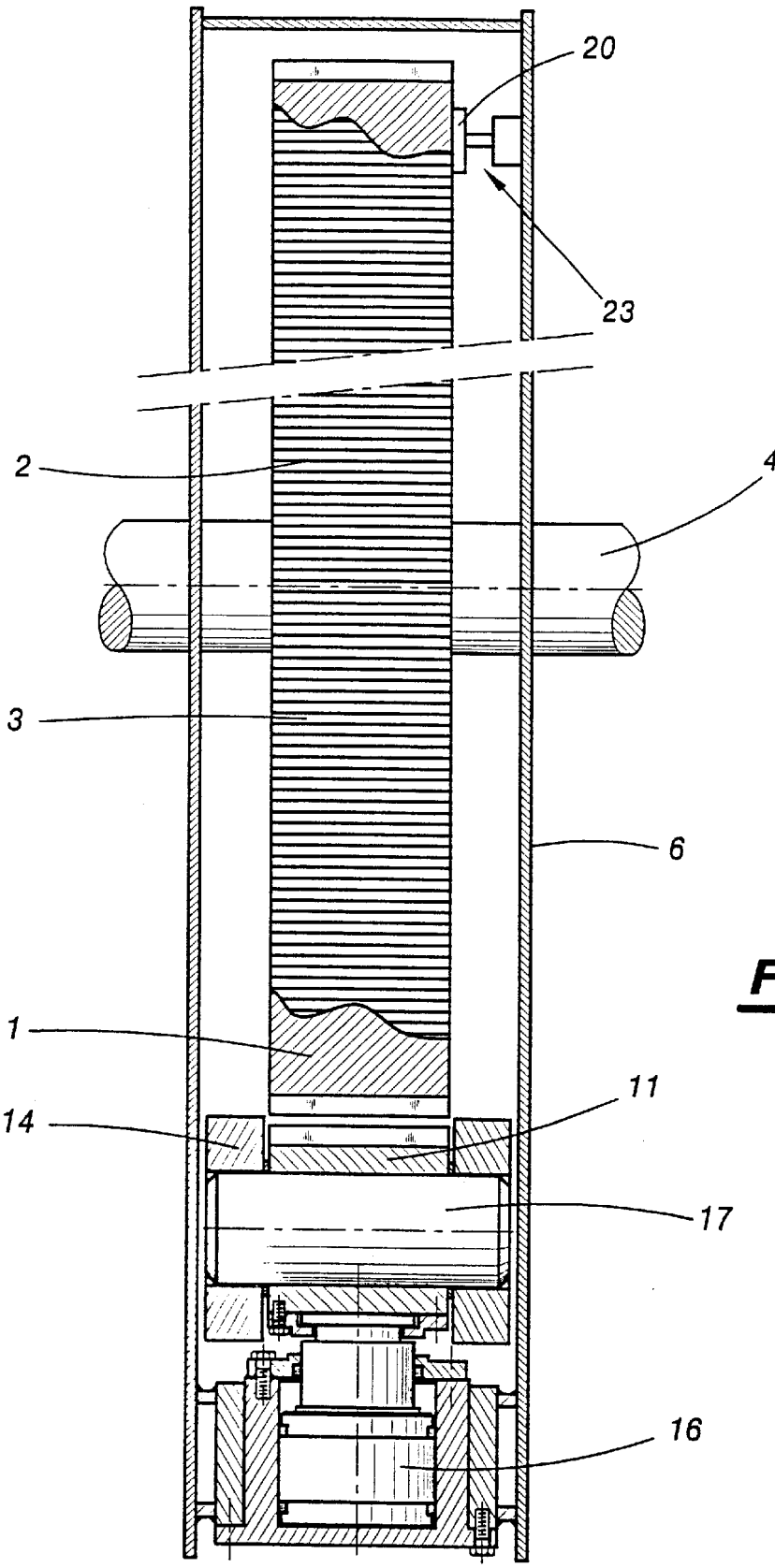
FIG. 4 is a schematic view in section taken along the line 4—4 in FIG. 1.
Figure 5:
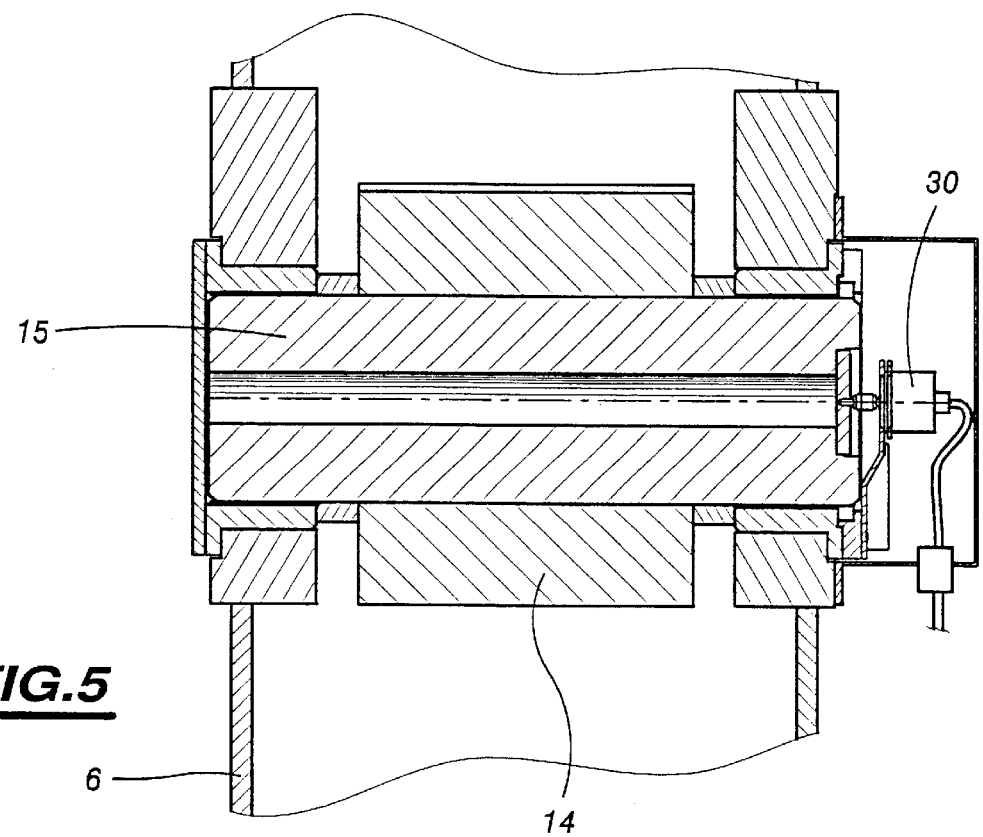
FIG. 5 is a view in section taken along the line 5—5 in FIG. 1.

As shown in FIGS. 2 to 4 in particular, the immobilizing device 10 includes a member 11 which has at its periphery upstanding parts 12 and recessed parts 13 whose profile is complementary to that of the upstanding parts 2 and recessed parts 3 of the ring 1 to be immobilized.

The member 11 is mounted at the end 14a of an arm 14 whose opposite end 14b pivots on a shaft 15.

The member 11 can therefore be moved by having a unit 16 swing the arm 14 about the shaft 15 between a passive position disengaged from the wheel 1 and an active position in which the upstanding parts 2 and 12 and the recessed parts 3 and 13 of the wheel 1 and the member 11, respectively, interpenetrate to immobilize the wheel 1 in the particular position, as explained hereinbelow.

In the embodiment of the invention shown in the drawings, the member 11 is articulated to the end 14a of the arm 14 by means of a shaft 17 carried by the arm 14.

In a variant, the member 11 is fixed directly to the end 14a of the arm 14 to form a one-piece assembly.

The immobilizing device 10 is inside the casing 6 and in this case the bearings 18 carrying the shaft 15 are fastened to casing 6.

As an alternative, the immobilizing device 10 can be outside the casing 6.

The unit 16 for moving the member 11 is a ram with a piston rod whose free end bears on a face of the member 11 opposite that with the upstanding parts 12 and recessed parts 13.

The bearing surface of contact between the free end of the piston rod of the ram 16 and the member 11 is preferably spherical.

The ram 16 is a hydraulic or pneumatic ram. The unit for moving the member 11 can be any other appropriate system, for example a mechanical or spring system.

Moreover, the immobilizing device 10 includes means for indexing the position of the ring 1 to be immobilized in a particular position to place the upstanding parts 2 of ring 1 opposite the recessed parts 13 of the member 11 and means for sensing the position of the arm 14 carrying the member 11.

As shown in FIGS. 1, 2, 4 and 6, the means for indexing the position of the ring 1 include a track 20 formed on a lateral face of ring 1 and including a succession of projections 21 and recesses 22 at locations corresponding to the upstanding parts 12 and recessed parts 13 of the ring 1.

The means for indexing the position of the ring 1 also include a unit 23 for sensing the projections 21 and the recesses 22 of the track 20.

Figure 6:
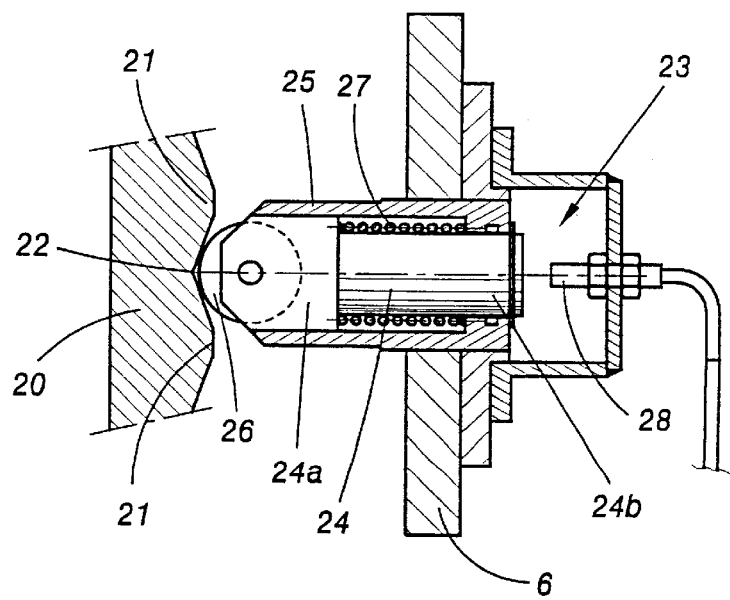
FIG. 6 is a schematic sectional view of means for indexing the position of the element to be immobilized of the kinematic system.

As shown in FIG. 6, the sensing unit 23 is formed by a rod 24 sliding in a support 25 which is fixed to the casing 6.

The rod 24 carries at one end 24a a roller 26 which is able to rotate freely and which is pressed against the track 20 by a spring 27 acting on the rod 24.

The end 24b of the rod 24 cooperates with a proximity sensor 28 which senses movement of rod 24 when the roller 26 rolls on the projections 21 and the recesses 22 of the track as the ring 1 rotates.

The proximity sensor 28 controls stopping of the ring 1 in a particular angular position.

The means for sensing the position of the arm 14 are in the form of an encoder 30 mounted on the shaft 15 of the arm 14 and which, through the intermediary of arm 14, senses the deployed position of the piston rod of the ram 16, which is indicative of the relative position of the member 11 and the ring 1.

Figure 7:
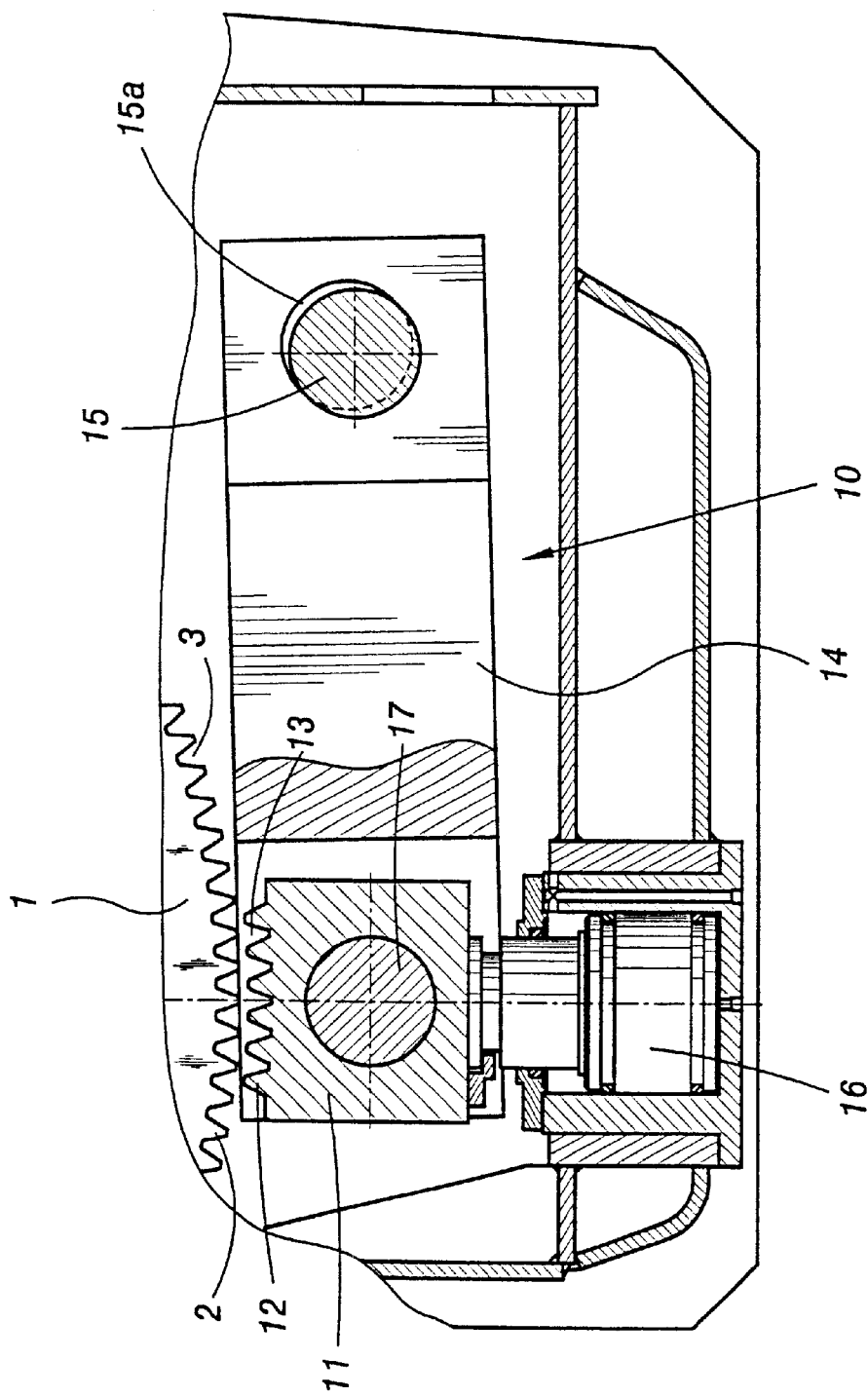
FIG. 7 is a schematic sectional view of a second embodiment of the immobilizing device of the invention, a FIG. 8 is a schematic elevation view of a variant of a kinematic system equipped with an immobilizing device in accordance with the invention.

In a variant shown in FIG. 7, the shaft 15 of the arm 14 has a cam 15a to move the upstanding parts 12 and recessed parts 13 of the member 11 tangentially relative to the upstanding parts 2 and recessed parts 3 of the ring 1.

The cam 15a is operated by a lever, for example, or by a drive system, and the tangential movement of the member 11 associated with the thrust of the ram 16 assures total penetration and immobilization of the ring 1 by the member 11.

Figure 8:
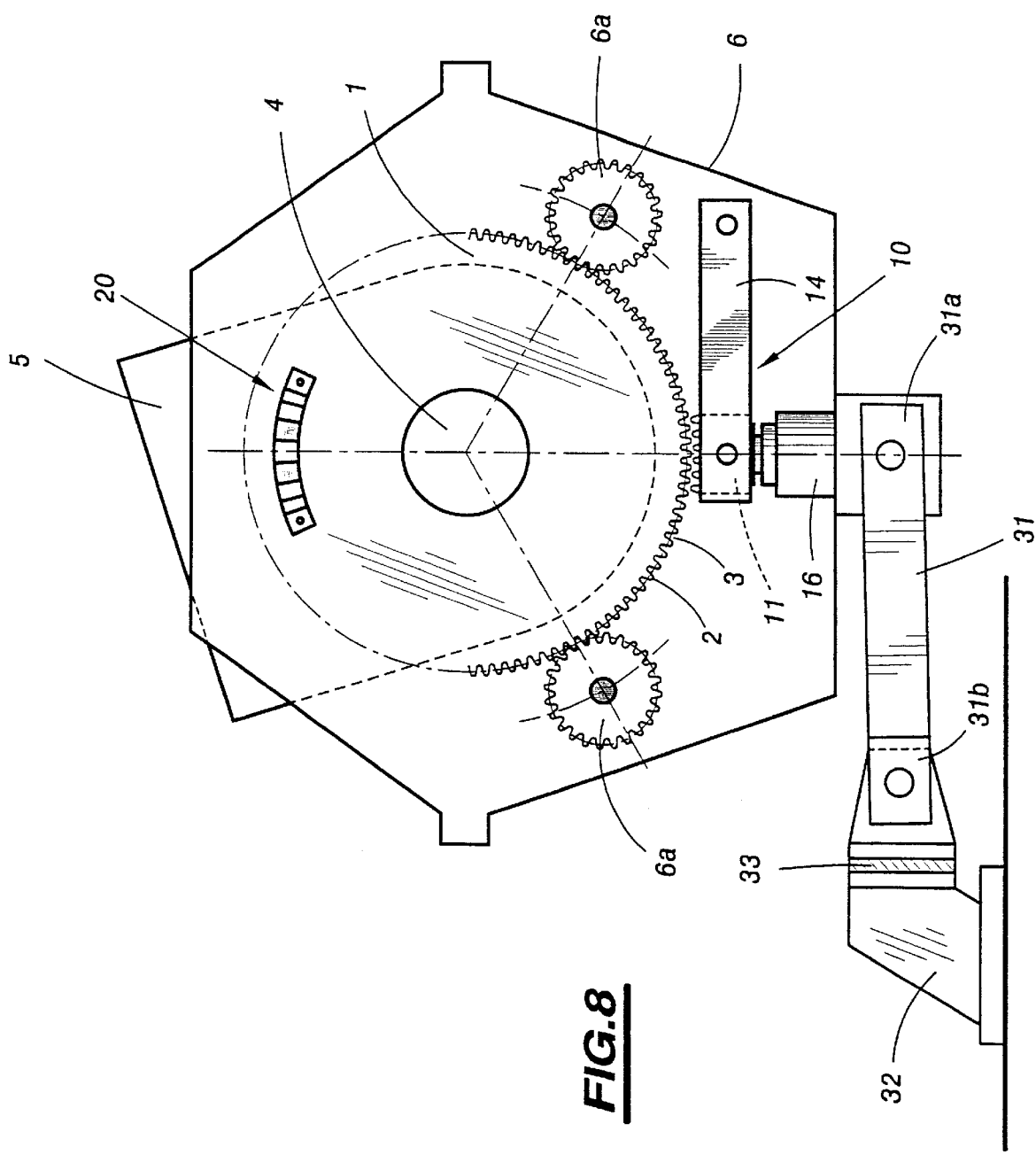

Finally, in a variant shown in FIG. 8, the casing 6 is provided with an anti-torque reaction bar 31 whose first end 31a is articulated to the casing 6 and whose second end 31b is articulated to a support 32.

The bar 31 balances the tilting torque exerted on the shaft 4 of the converter ladle 5.

The bar 31 includes means for adjusting the position of the ring 1 relative to a reference mark on the installation, for example by modifying the length of the bar 31.

The length of the reaction bar 31 can be modified by any appropriate device, for example by shims 33 of different thicknesses placed in the support 32.

The immobilizing device 10 is activated when the process requires the converter ladle to be immobilized against rotation, for example to blow gases into the ladle.

The ladle 5 has already been angularly, prepositioned by means of an encoder (not shown), mounted on one of the shafts of the kinematic system.

The final relative angular position of the ring 1 and the immobilizing member 11 is obtained with the aid of the projections 21 and the recesses 22 of the track 20, whose positions are determined so that they correspond to an upstanding part 2 or a recessed part 3 of the ring 1.

The roller 26 mounted at the end of the rod 24 rolls on the track 20.

The proximity sensor 28 detects a projection 21 or a recess 22 of the track 20 by virtue of the axial displacement of the rod 24, and stops the ring 1 in an angular position such that the upstanding parts 2 of the ring 1 face the recessed parts 13 of the immobilizing member 11.

The ring 1 when stopped is held in position by a conventional brake device (not shown).

The tops of the upstanding parts 12 of the member 11 have bevels referred to as entry surfaces so that if the tops of the upstanding parts 2 of the ring 1 come close to the tops of the upstanding parts of the member 11 and come into contact when the ram 16 is operated, the slightest residual torque on releasing the brakes will cause rotation of the ring 1 which, associated with the pressure supplied by said ram 16, will bring about total interpenetration of the upstanding parts 2 and 12 and the recessed parts 3 and 13, respectively, of the ring 1 and the member 11.

When the ram 16 is operated to immobilize the ring 1 by means of the member 11, and through the intermediary of the angular position of the arm 14, the encoder 30 on the shaft 15 of the arm 14 senses the deployed position of the piston rod of the ram 16, which is indicative of the position of the member 11 relative to the ring 1.

The information supplied corresponds to total disengagement or pre-engagement or total engagement of the member 11 in the immobilizing position relative to the ring 1.

If, during engagement of the member 11 under the control of the ram 16, at a predefined pressure, the pre-engagement position of the member 11 as measured by the encoder 30 has not been reached at the end of a predetermined time-delay, this information indicates a positioning error, for example that the upstanding parts 2 and 12, respectively, of the ring 1 and the member 11 are facing each other, engagement becomes impossible and the actuators command an emergency stop of the installation.

On the other hand, if the information supplied by the encoder 30 indicates that the upstanding parts 2 of the ring 1 are facing the recessed parts 13 of the member 11, the piston rod of the ram 16 continues its stroke and the upstanding parts 2 and 12 and the recessed parts 3 and 13 of the ring 1 and the member 11, respectively, interpenetrate totally to immobilize the ring 1, and thereby the converter ladle 5, against rotation.

If the immobilizing device 10 includes the cam 15a on the shaft 15 of the arm 14, the cam 15a is operated either by a lever or by means of a drive system if the encoder 30 senses that the upstanding parts 2 and 12 of the ring 1 and the member 11, respectively, are facing each other.

Accordingly, the tangential movement of the arm 14 and the member 11 associated with the thrust of the ram 16 assures total interpenetration of the upstanding and recessed parts of the ring 1 and the member 11 and immobilizes ring 1.

The brakes of the installation are released during this operation.

This variant is feasible only if the member 11 is articulated to the arm 14 by means of the shaft 17.

If the member 11 is attached to the arm 14 to form a one-piece assembly, the bores receiving the shaft 15 are machined with the arm 14 inside the casing 6, the upstanding and recessed parts of the ring 1 and the member 11 being interengaged and pressed together.

Because of these articulated connections the immobilizing device of the invention does not cause any overstressing of the kinematic system, and the upstanding and recessed parts of the ring and the immobilizing member are automatically aligned to obtain a uniform distribution of the immobilizing force transmitted by the ram.

The radial prestressing thrust force on the upstanding parts of the ring is adjusted to suit operating conditions.

The ring to be immobilized can be equipped with a plurality of immobilizing devices regularly distributed around its periphery.

The immobilizing device of the invention immobilizes the corresponding member in a precise angular position of that member in total safety and without backlash.

What is claimed is:

1. A device for immobilizing an element (1) of a kinematic system, said element (1) carrying a succession of upstanding parts (2) and recessed parts (3), and including:
   (a) a member (11) having at its periphery upstanding parts (12) and recessed parts (13) complementary in profile to the upstanding parts (2) and recessed parts (3) of the element (1) to be immobilized and mounted at one end (14a) of an arm (14) whose opposite end (14b) is articulated about a pivot shaft (15);
   (b) a unit (16) for moving said member (11) between a passive position disengaging from the element (1) to be immobilized and an active position in which the upstanding parts (2; 12) and the recessed parts (3; 13), respectively, of said element (1) and said member (11) interpenetrate to immobilize said element (1) in a particular position;

(c) means (20, 23) for indexing a position of the element (1) in said particular position to place the upstanding parts (2; 12) facing the recessed parts (3; 13), respectively, of said element (1) and said member (11); and (d) means (30) for sensing the position of said arm (14).

2. The device according to claim 1, wherein the member (11) is fixed to said one end (14a) of the arm (14) to form a one-piece assembly.

3. The device according to claim 1, wherein the member (11) is articulated to said one end (14a) of the arm (14) by means of a shaft (17) carried by said arm (14).

4. The device according to claim 1, wherein the unit for moving the member (11) is a ram (16) having a piston rod whose free end bears on a face of the member (11) opposite the face with the upstanding parts (12) and recessed parts (13).

5. The device according to claim 4, wherein a bearing surface of contact between the free end of the piston rod of the ram (16) and said member (11) is spherical.

6. The device according to claim 1, wherein the indexing means include a track (20) formed on said element (1) and including a succession of projections (21) and recesses (22) in locations corresponding to the upstanding parts (2) and recessed parts (3) of the element (1) and a unit (23) for sensing the projections (21) and the recesses (22) of said track (20).

7. The device according to claim 6, wherein the sensing unit (23) is formed by a proximity sensor (28) cooperating with a rod (24) adapted to move in translation and carrying at one end a roller (26) rolling on said track (20).

8. The device according to claim 1, including means (15; 15a) for positioning in translation the arm (14) carrying said member (11).

9. The device according to claim 8, wherein the means for positioning the arm (14) in translation are formed by a cam (15a) formed on the pivot shaft (15) of said arm (14).

10. The device according to claim 1, wherein the means for sensing the position of the arm (14) are formed by an encoder (30) mounted on a pivot shaft (15) of the arm (14).

11. The device according to claim 1, wherein the element (1) to be immobilized is disposed in a casing (6).

12. The device according to claim 1, wherein the assembly formed by the member (11), the arm (14) and the unit (16) for displacing the member (11) is inside the casing (6).

13. The device according to claim 1, wherein the assembly formed of the member (11), the arm (14) and the unit (16) for displacing the member (11) is outside the casing (6).

14. Device according to claim 11, wherein the casing (6) has an anti-torque reaction bar (31) including means (33) for adjusting the position of the element (1) to be immobilized relative to a reference marker of the installation by modifying the length of the reaction bar (31).

15. An installation for controlling tilting of a steelmaking converter ladle (5), the installation including a toothed ring (1) attached to a pivot shaft (4) of said ladle (5) and driven in rotation by at least one gear, wherein said ring (1) includes at least one immobilizing device (10) according to claim 1.

* * * * *